US005495298A

United States Patent [19]
Uchida et al.

[11] Patent Number: 5,495,298
[45] Date of Patent: Feb. 27, 1996

[54] APPARATUS FOR CONCEALING DETECTED ERRONEOUS DATA IN A DIGITAL IMAGE SIGNAL

[75] Inventors: Masashi Uchida; Tetsujiro Kondo; Hideo Nakaya, all of Kanagawa, Japan

[73] Assignee: Sony Corporation, Tokyo, Japan

[21] Appl. No.: 215,612

[22] Filed: Mar. 22, 1994

[30] Foreign Application Priority Data

Mar. 24, 1993 [JP] Japan .................................. 5-089235

[51] Int. Cl.⁶ .............................. H04N 7/24; H04N 5/21
[52] U.S. Cl. .......................... 348/615; 348/616; 348/421; 348/472; 358/314
[58] Field of Search ..................................... 348/615, 616, 348/421; 358/314; H04N 7/24, 5/21

[56] References Cited

U.S. PATENT DOCUMENTS

| | | | |
|---|---|---|---|
| 4,703,352 | 10/1987 | Kondo ............................... | 348/421 |
| 5,023,710 | 6/1991 | Kondo et al. ..................... | 348/421 |

FOREIGN PATENT DOCUMENTS

| | | | |
|---|---|---|---|
| 0060095 | 9/1982 | European Pat. Off. .......... | H04N 5/92 |
| 0156154 | 10/1985 | European Pat. Off. .......... | G11B 5/09 |
| 0373924 | 6/1990 | European Pat. Off. .......... | H04N 7/12 |
| 0398741 | 11/1990 | European Pat. Off. .......... | H04N 7/13 |

OTHER PUBLICATIONS

SMPTE Journal, vol. 93, No. 2, Feb. 1984, Scarsdale, NY, US.–J. K. R. Heitmann, 'Digital Video Recording: New Results In Channel Coding and Error Protection', pp. 140–144.

Patent Abstracts of Japan, vol. 14, No. 99 (E–893), 22 Feb. 1990, JP-A-01 302 919 (Sharp) 6 Dec. 1989.

Patent Abstracts of Japan, vol. 17, No. 101 (E–1327), 2 Mar. 1993, JP-A-04 290 316 (Fujitsu), 14 Oct. 1992.

Patent Abstracts of Japan, vol. 17, No. 254 (P–1538), 19 May 1993, JP-A-04 370 583 (Mitsubishi Electric), 22 Dec. 1992.

*Primary Examiner*—James J. Groody
*Assistant Examiner*—Cheryl Cohen
*Attorney, Agent, or Firm*—William S. Frommer

[57] ABSTRACT

An apparatus for concealing error data of pixel data in a digital image signal. The apparatus includes a deframing circuit for detecting errors every predetermined unit to generate a first error flag in high order bit planes including at least the most significant bit plane of bit planes of pixel data in a received digital image signal and for forming a second error flag representing the presence or absence of an error in each of the bits forming the pixel data every pixel data in the high order bit planes on the basis of the first error flag. The apparatus further includes an error correcting device for calculating a plurality of possible data values of the pixel data and for selecting one data value from among the plurality of possible data values, taking the correlation between the pixel data and surrounding pixel data into consideration, on the basis of the second error flag representing the presence or absence of an error in each of the bits forming the pixel data when the pixel data has an error.

11 Claims, 8 Drawing Sheets

Fig. 4

| 56 | 24 | 64 | 32 | 8 | 40 | 16 | 48 |
|----|----|----|----|----|----|----|----|
| 39 | 7 | 47 | 15 | 55 | 23 | 63 | 31 |
| 22 | 54 | 30 | 6 | 38 | 62 | 46 | 14 |
| 5 | 37 | 13 | 45 | 21 | 53 | 29 | 61 |
| 52 | 20 | 60 | 28 | 4 | 36 | 12 | 44 |
| 35 | 3 | 43 | 11 | 51 | 19 | 59 | 27 |
| 18 | 50 | 26 | 58 | 34 | 2 | 42 | 10 |
| 1 | 33 | 9 | 41 | 17 | 49 | 25 | 57 |

HORIZONTAL DIRECTION →

| 1 | 2 | 3 | 4 | 5 | 6 | 7 | 8 |
|----|----|----|----|----|----|----|----|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |
| 49 | 50 | 51 | 52 | 53 | 54 | 55 | 56 |
| 57 | 58 | 59 | 60 | 61 | 62 | 63 | 64 |

VERTICAL DIRECTION ↓

Fig. 6

| | 1 | 2 | 3 | 4 | 5 | 6 | 7 | 8 |
|---|---|---|---|---|---|---|---|---|
| | 56 | 24 | 64 | 32 | 8 | 40 | 16 | 48 |
| | 39 | 7 | 47 | 15 | 55 | 23 | 63 | 31 |
| | 22 | 54 | 30 | 6 | 38 | 62 | 46 | 14 |
| | 5 | 37 | 13 | 45 | 21 | 53 | 29 | 61 |
| | 52 | 20 | 60 | 28 | 4 | 36 | 12 | 44 |
| | 35 | 3 | 43 | 11 | 51 | 19 | 59 | 27 |
| | 18 | 50 | 26 | 58 | 34 | 2 | 42 | 10 |
| | 1 | 33 | 9 | 41 | 17 | 49 | 25 | 57 |

Fig. 7

HORIZONTAL DIRECTION →

VERTICAL DIRECTION ↓

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |
| 49 | 50 | 51 | 52 | 53 | 54 | 55 | 56 |
| 57 | 58 | 59 | 60 | 61 | 62 | 63 | 64 |

Fig. 8

| ERROR FLAG | 0 | 0 | 1 | 0 | 0 | 0 | 0 | 0 | 1 | 0 | 0 | 0 | 0 | 0 | 0 | 0 | 1 | 0 | 0 | 0 | 0 | 0 | 0 | 0 | 1 | 0 | 0 | 0 | 0 | 0 | 1 | 0 | 0 |
|---|---|---|---|---|---|---|---|---|---|---|---|---|---|---|---|---|---|---|---|---|---|---|---|---|---|---|---|---|---|---|---|---|---|
| QUANTIZED DATA | 56 | 24 | 64 | 32 | 8 | 40 | 16 | 48 | 56 | 24 | 64 | 32 | 8 | 40 | 16 | 48 | 56 | 24 | 64 | 32 | 8 | 40 | 16 | 48 | 56 | 24 | 64 | 32 | 8 | 40 | 16 | 48 | |
| | 39 | 7 | 47 | 16 | 66 | 23 | 63 | 31 | 39 | 7 | 47 | 16 | 66 | 23 | 63 | 31 | 39 | 7 | 47 | 16 | 66 | 23 | 63 | 31 | 39 | 7 | 47 | 16 | 66 | 23 | 63 | 31 | |
| | 22 | 54 | 30 | 6 | 38 | 62 | 46 | 14 | 22 | 54 | 30 | 6 | 38 | 62 | 46 | 14 | 22 | 54 | 30 | 6 | 38 | 62 | 46 | 14 | 22 | 54 | 30 | 6 | 38 | 62 | 46 | 14 | |
| | 6 | 37 | 13 | 45 | 21 | 53 | 29 | 61 | 6 | 37 | 13 | 46 | 21 | 53 | 29 | 61 | 6 | 37 | 13 | 46 | 21 | 53 | 29 | 61 | 6 | 37 | 13 | 45 | 21 | 53 | 29 | 61 | |
| | 52 | 20 | 60 | 28 | 4 | 36 | 12 | 44 | 52 | 20 | 60 | 28 | 4 | 36 | 12 | 44 | 52 | 20 | 60 | 28 | 4 | 36 | 12 | 44 | 52 | 20 | 60 | 28 | 4 | 36 | 12 | 44 | |
| | 35 | 3 | 43 | 11 | 51 | 19 | 59 | 27 | 35 | 3 | 43 | 11 | 51 | 19 | 59 | 27 | 35 | 3 | 43 | 11 | 51 | 19 | 59 | 27 | 35 | 3 | 43 | 11 | 51 | 19 | 59 | 27 | |
| | 18 | 50 | 26 | 58 | 34 | 2 | 42 | 10 | 18 | 50 | 26 | 58 | 34 | 2 | 42 | 10 | 18 | 50 | 26 | 58 | 34 | 2 | 42 | 10 | 18 | 50 | 26 | 58 | 34 | 2 | 42 | 10 | |
| | 1 | 33 | 9 | 41 | 17 | 49 | 25 | 57 | 1 | 33 | 9 | 41 | 17 | 49 | 25 | 57 | 1 | 33 | 9 | 41 | 17 | 49 | 25 | 57 | 1 | 33 | 9 | 41 | 17 | 49 | 25 | 57 | |
| BYTE NUMBER | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | |

|  | DATA | ERROR FLAG |
|---|---|---|
| DR | 10011000 | 0 |
| MIN | 00110101 | 0 |
| QUANTIZED DATA 1 | 0010 | 0100 |
| QUANTIZED DATA 2 | 0110 | 0001 |
| QUANTIZED DATA 3 | 1000 | 0000 |
| . . . | . . . | . . . |
| QUANTIZED DATA 63 | 0011 | 0000 |
| QUANTIZED DATA 64 | 0001 | 1000 |

APPARATUS FOR CONCEALING DETECTED ERRONEOUS DATA IN A DIGITAL IMAGE SIGNAL

BACKGROUND OF THE INVENTION

1. Field of the Invention

The present invention relates to an apparatus for concealing error data of pixel data in a received digital image signal which is applied to recording and/or reproducing a digital image signal with a digital VTR which uses, for example, a highly efficient coding technique.

2. Description of the Prior Art

When a digital video signal is recorded on a recording medium such as a magnetic tape, the amount of information of the digital video signal is large. In recent years, to deal with the digital video signal, highly efficient coding techniques which compress such a digital video signal have been generally employed. An example of the highly efficient coding techniques, ADRC (Adaptive Dynamic Range Coding) technique is known.

The ADRC technique is an highly efficient coding technique which obtains a dynamic range defined by a maximum value and a minimum value of a plurality of pixels contained in a two-dimensional block of a signal and then encodes the signal corresponding to the dynamic range, as disclosed in U.S. Pat. No. 4,703,352.

The encoded output of an ADRC process is constructed of data called important word and quantized data of each pixel. The important word consists of a dynamic range DR and a minimum value MIN. If an error occurred in the important word, the error would propagate to all pixels of the block. Thus, this data is called the important word. With respect to errors of quantized data, since the ADRC process does not compress image data in space direction, even if an error occurs in quantized data upon transmitting, the error does not propagate to decoded data of other pixels. Thus, if a pixel with an error were interpolated with pixel data adjacent thereto, the error would become unremarkable. Such an interpolating process is referred to as a concealing process.

In the conventional pixel-by-pixel concealing technique, a pixel with an error is substituted with the average value of the adjacent pixels or a pixel value adjacent thereto. Thus, the resolution is deteriorated at the pixel with the error.

Even if visual deterioration is none or small, when multiple-dubbing where dubbing is repeated is performed, the image quality of the restored image may be deteriorated since a decoded value is largely apart from a real decoded value.

OBJECTS AND SUMMARY OF THE INVENTION

It is, therefore, an object of the present invention to provide an apparatus for concealing error data of pixel data in a received digital image signal which can solve or reduce the above described problems.

According to an aspect of the invention, there is provided an apparatus for concealing error data of pixel data in a received digital image signal, comprising:

receiving means for receiving the digital image signal;

deframing means for detecting errors every predetermined unit to generate a first error flag in high order bit planes including at least the most significant bit plane of bit planes of pixel data in the received digital image signal and for forming a second error flag representing presence or absence of an error in each of bits forming the pixel data every pixel data in said high order bit planes on the basis of the first error flag; and error correcting means for calculating a plurality of possible data values of the pixel data and for selecting one data value from among the plurality of possible data values, taking the correlation between the pixel data and surrounding pixel data into consideration, on the basis of the second error flag representing presence or absence of an error in each of bits forming the pixel data when the pixel data has an error.

The above, and other, objects, features and advantage of the present invention will become readily apparent from the following detailed description thereof which is to be read in connection with the accompanying drawings.

BRIEF DESCRIPTION OF THE DRAWINGS

FIG. 4 is a schematic diagram showing an arrangement of data of each plane;

FIG. 5 is a schematic diagram showing numbering of pixels in a block;

FIG. 6 is a schematic diagram showing an example of one-byte error of a plane;

FIG. 7 is a schematic diagram showing an example of affection of one-byte error to data in space;

FIG. 8 is a schematic diagram showing an example of quantized data and error flags;

DETAILED DESCRIPTION OF THE PREFERRED EMBODIMENTS

An embodiment in which a concealing apparatus according to the present invention has been applied to a digital VTR using an ADRC technique will now be described hereunder.

Figure 1:
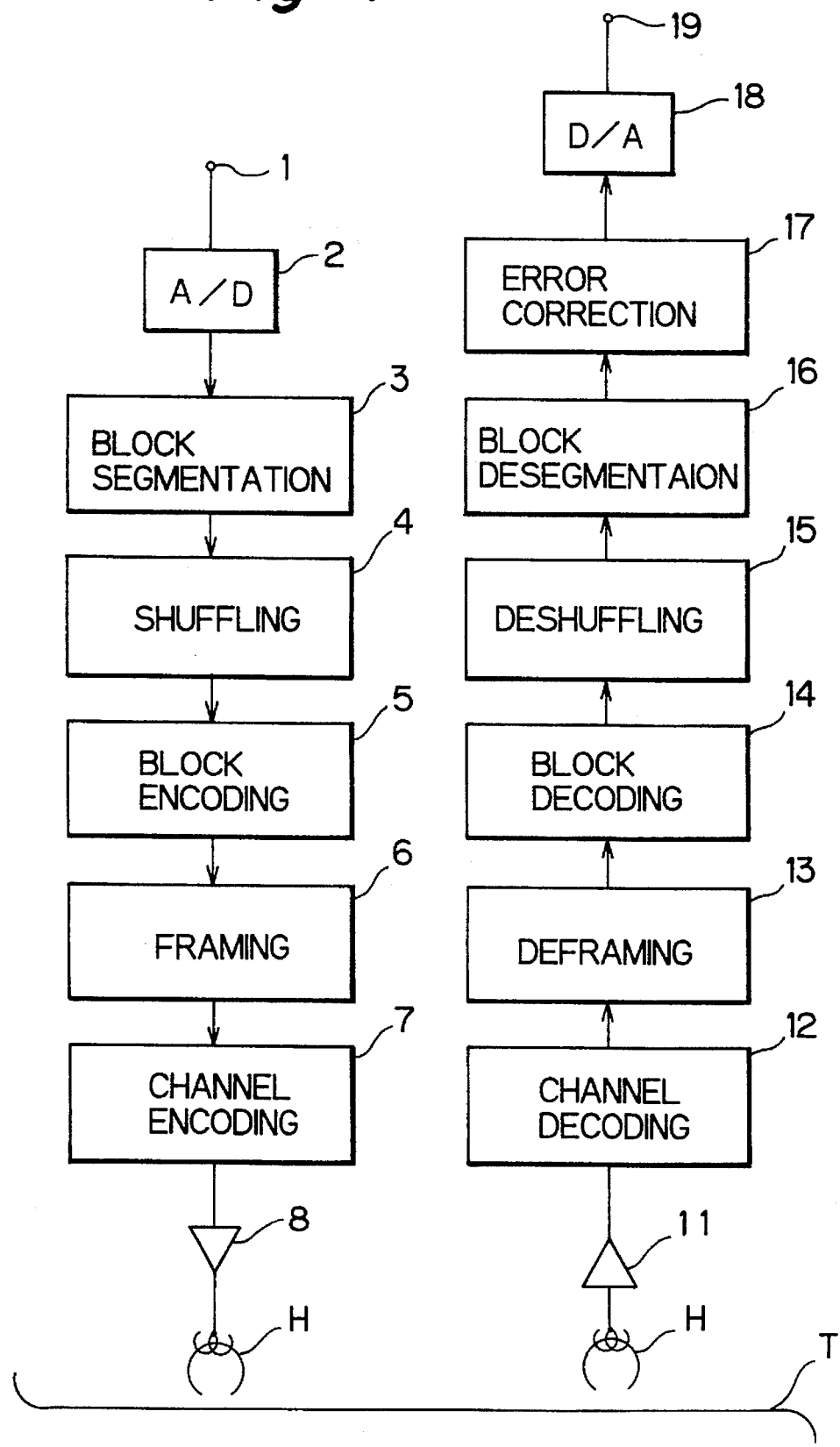
FIG. 1 is a block diagram showing an example of the construction of a recording system and a reproducing system of a digital VTR to which the present invention can be applied.

FIG. 1 is a block diagram showing the construction of a signal processing system in a digital VTR according to the embodiment of the present invention. First, a recording system according to the present invention will be described. A video signal is supplied from an input terminal 1. The video signal is sent to an A/D converter 2. The A/D converter 2 digitizes one sample of the video signal to, for example, eight bits of data. An output data of the A/D converter 2 is supplied to a block segmentation circuit 3. In this embodiment, the block segmentation circuit 3 segments the effective region of one frame into a plurality of blocks of, for example, (8×8) pixels.

A digital video signal from the block segmentation circuit 3, which has been scanned and transformed into block sequence, is supplied to a shuffling circuit 4. The shuffling circuit 4 performs shuffling on the block basis. Shuffling means to shuffle space positions of blocks in each frame. An output signal of the shuffling circuit 4 is supplied to a block encoding circuit 5. The block encoding circuit 5 compresses and encodes pixel data for each block according to the ADRC technique. The shuffling circuit 4 may be preceded by the block encoding circuit 5.

In this embodiment, as a block encoding technique, a fixed-length ADRC technique is used. The block encoding circuit 5 detects a dynamic range DR and a minimum value MIN of each block and requantizes video data, where the minimum value of each block has been removed, in a predetermined quantizing step. In this embodiment, the number of quantizing bits is fixed to, for example, four bits. Thus, the quantizing step is suitable for the dynamic range DR.

In the case that the number of quantizing bits is four, by dividing the dynamic range DR by 16, a quantizing step $\Delta$ can be obtained. The video data where the minimum value has been removed for each block is divided by the quantizing step $\Delta$. By rounding off the resultant quotient, quantized data is obtained. The dynamic range DR, the minimum value MIN, and the quantized data are output data from the block encoding circuit 5.

An output data of the block encoding circuit 5 is supplied to a framing circuit 6. The framing circuit 6 generates a parity for error correction code. In addition, the framing circuit 6 generates record data which is a sequence of synchronous blocks. The synchronous block may comprise one block for which an ADRC process has been performed, or a plurality of such blocks. As the error correction code, for example, a product code is used so as to perform error correction encoding both in the horizontal direction and the vertical direction of data matrix. A sync block synchronous signal and an ID signal are added to encoded data and parity.

Figure 2:
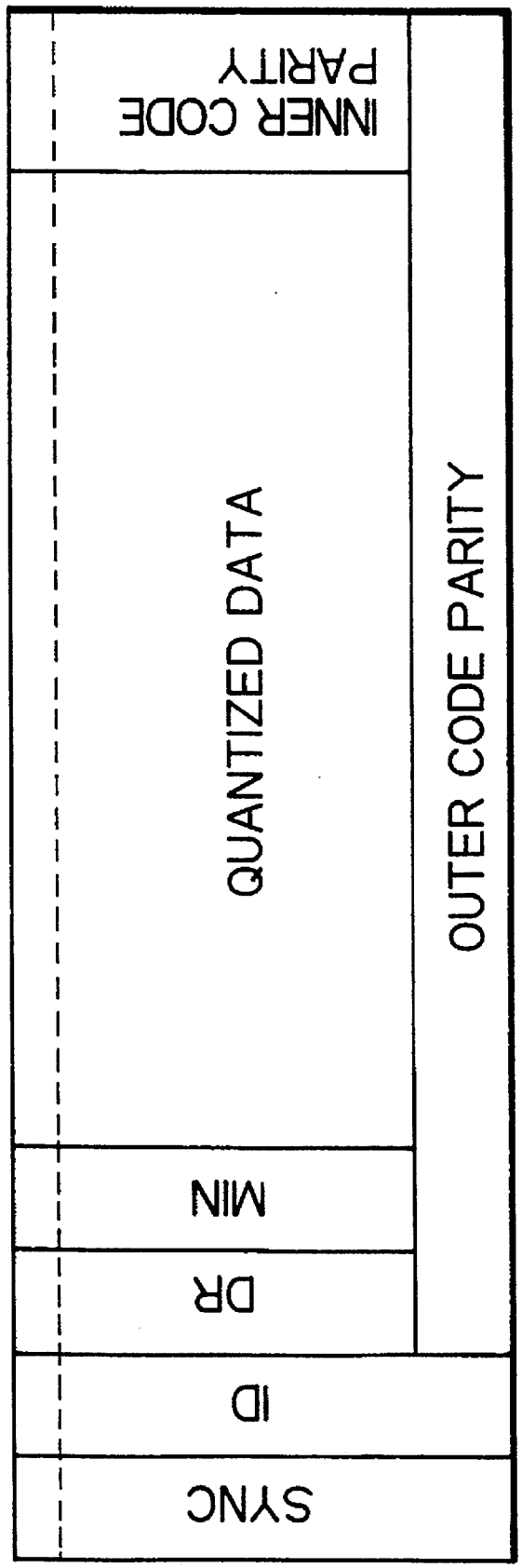
FIG. 2 is a schematic diagram showing an example of framing in an embodiment of the present invention.

FIG. 2 shows an example of the construction of record data outputted from the framing circuit 6. Each synchronous block starts with a synchronous signal (SYNC), followed by an ID signal for controlling. In the data region of each synchronous block, a dynamic range DR, a minimum value MIN, and quantized data corresponding to each pixel.

The record data is constructed by placing a plurality of such synchronous blocks in a two-dimensional array. In FIG. 2, a dashed line represents the boundary of one synchronous block. The error correction encoding is performed both in the horizontal (row) direction and vertical (column) direction of the two-dimensional array. Redundant data formed of the horizontal data is an inner code parity. Redundant data formed of the vertical data is an outer code parity. Thus, the error correction encoding uses a so-called product code.

Figure 3:
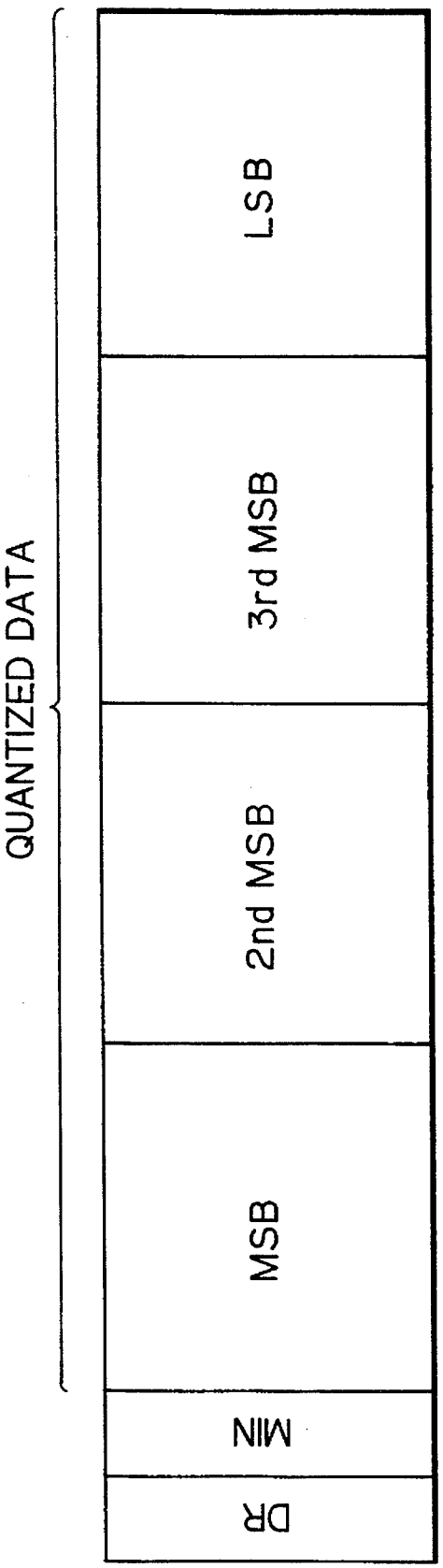
FIG. 3 is a schematic diagram showing data construction of a synchronous block in the embodiment of the present invention.

FIG. 3 shows an example of the data construction of one synchronous block. In this example, the encoded output of one block for which an ADRC has been performed is stored in one synchronous block. As described above, since the number of bits of quantized data is fixed to four, one block results in 64 quantized data (this is because 4×8×8=32 bytes=128 bits). When the most significant bit, the second most significant bit, the third most significant bit, and the least significant bit of quantized data are denoted as MSB, 2nd MSB (second MSB), 3rd MSB (third MSB), and LSB, respectively, quantized data of each block are placed in MSB, 2nd MSB, 3rd MSB, and LSB (each of them is referred as a plane hereafter).

Quantized data of pixels of an ADRC block which are spaced apart from each other are placed in each byte which is a unit of error detection in a synchronous block. In other words, quantized data are placed in the planes with a pattern as shown in FIG. 4. Numerals in FIG. 4 represent space positions of pixels of an image shown in FIG. 5. Numerals below the block of FIG. 4 are byte numbers for each plane. For example, MSBs of quantized data of pixel numbers (56, 39, 22, 5, 52, 35, 18, 1) contained in the first byte are placed at the MSB plane of FIG. 3. As shown in FIG. 4, by changing the positions of the pixels of a block, even if an error occurs in a byte when data is reproduced, the probability of which errors simultaneously occur at the adjacent pixels when data is decoded can be decreased.

FIGS. 6 and 7 are schematic diagrams for explaining how such a secondary error can be prevented. Assume that errors occur in a particular byte (namely, third byte in this case) as shown in shaded regions in FIG. 6. When the data shown in FIG. 6 is decoded, errors occur only in pixels at the positions shaded in FIG. 7. Since errors do not occur in eight pixels adjacent to the pixel with the error, the errors can be easily concealed.

Returning to FIG. 1, the framing circuit 6 supplies record data which is a sequence of synchronous blocks to a channel encoding circuit 7. The channel encoding circuit 7 performs a channel encoding process so as to reduce a DC component from the record data. An output data of the channel encoding circuit 7 is converted into a bit stream. An output of the channel encoding circuit 7 is supplied to a rotary head H through a record amplifier 8. Thus, the record data are recorded on slant tracks of a magnetic tape T. Normally, two or more rotary heads are used in the recording system. However, in the drawing, for the sake of simplicity, only one head is shown.

Next, with reference to FIG. 1, the construction of a reproducing system according to the present invention will be described. Data is reproduced by a rotary head H from a magnetic tape T. The reproduced data is supplied to a channel decoding circuit 12 through a reproducing amplifier 11. The channel decoding circuit 12 decodes data which has been channel encoded. An output data of the channel decoding circuit 12 is supplied to a deframing circuit 13.

The deframing circuit 13 decodes error correction code for each byte, thereby correcting an error of each byte of data. An error flag is set for each byte of data which cannot be restored by error correction so as to distinguish it from data without an error. Thereafter, the record data is broken down into various data. The deframing circuit 13 outputs data (of eight bits) and error flag (of one bit) corresponding to the dynamic range DR and the minimum value MIN. In addition, the deframing circuit 13 outputs data (of four bits) and error flag (of four bits) representing whether or not each plane has an error corresponding to quantized data.

Next, with reference to FIG. 8, the process for the error flags will be described. In FIG. 8, a row for ERROR FLAG represents an error flag for each byte. In the ERROR FLAG row, 0 represents absence of error, whereas 1 represents presence of error. Rows for QUANTIZED DATA represent quantized data of FIG. 3. Numerals in the QUANTIZED DATA rows are not real data, but addresses corresponding to the space positions of the pixels of FIG. 5.

If the state of the error flag of each byte is as shown in FIG. 8, an error has occurred in the MSBs of quantized data (9, 26, 43, . . . , 64); an error has occurred in the 2nd MSBs of quantized data (1, 18, 35, . . . , 56); an error has occurred in the 3rd MSBs of quantized data (41, 58, 11, . . . , 32); an error has occurred in the 3rd MSBs of quantized data (57, 10, 27, ..., 48); and an error has occurred in the LSBs of quantized data (49, 2, 19, ..., 40).

Figures 9, 10:
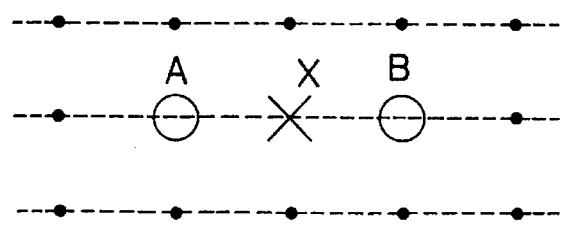
FIG. 9 is a table showing an example of the output of a deframing circuit.
FIG. 10 is a schematic diagram showing an example of pixels for use with a concealing process.

These error flags are converted into four-bit error flags corresponding to the respective planes. For example, if an error has occurred only at the 2nd MSB, the value of the error flag becomes 0100. If errors have occurred at the MSB and LSB, the value of the error flag becomes 1001. FIG. 9 is a table showing an example of the relation between encoded output data of one block and error flags thereof. Numerals of data and error flags in the drawing are denoted in binary notation.

An output data (for each block) of the deframing circuit 13 is constructed of a dynamic range DR (of eight bits), a minimum value MIN (of eight bits), an error flag (of one bit), quantized data (of four bits per pixel), and an error flag (of four bits). The output data of the deframing circuit 13 is supplied to a block decoding circuit 14.

The block decoding circuit 14 generates a decoded value Li for each pixel. In the case of the ADRC decoding, when the number of bits of quantized code is four, the decoded value Li can be given by the following equation.

$$Li=[(DR/(2^4)) \times xi+MIN+0.5] =[\Delta \times xi+MIN+0.5]$$

where $xi$ is the value of a quantized code signal; $\Delta$ is a quantizing step; and [ ] is a Gauss' notation. The block decoding circuit 14 has the construction in which the arithmetic operations in brackets "[ ]" are executed in, for example, a ROM and the addition of the minimum value MIN is performed.

If quantized code of a pixel has an error, it is not decoded. Instead, quantized data and error flag are outputted as they are. When the conventional ADRC decoding process is performed, the dynamic range DR and the minimum value MIN are not outputted. However, in the present invention, these data are outputted.

The decoded data of the block decoding circuit 14 is supplied to a deshuffling circuit 15. The deshuffling circuit 15 is a complementary circuit to the above-described shuffling circuit 4 of the recording system. In other words, the deshuffling circuit 15 restores the space positions of pixels of each block into the original space positions. An output data of the deshuffling circuit 15 is supplied to a block desegmentation circuit 16. The block desegmenting circuit 16 restores data of block sequence to data of raster scanning sequence.

Figure 11:
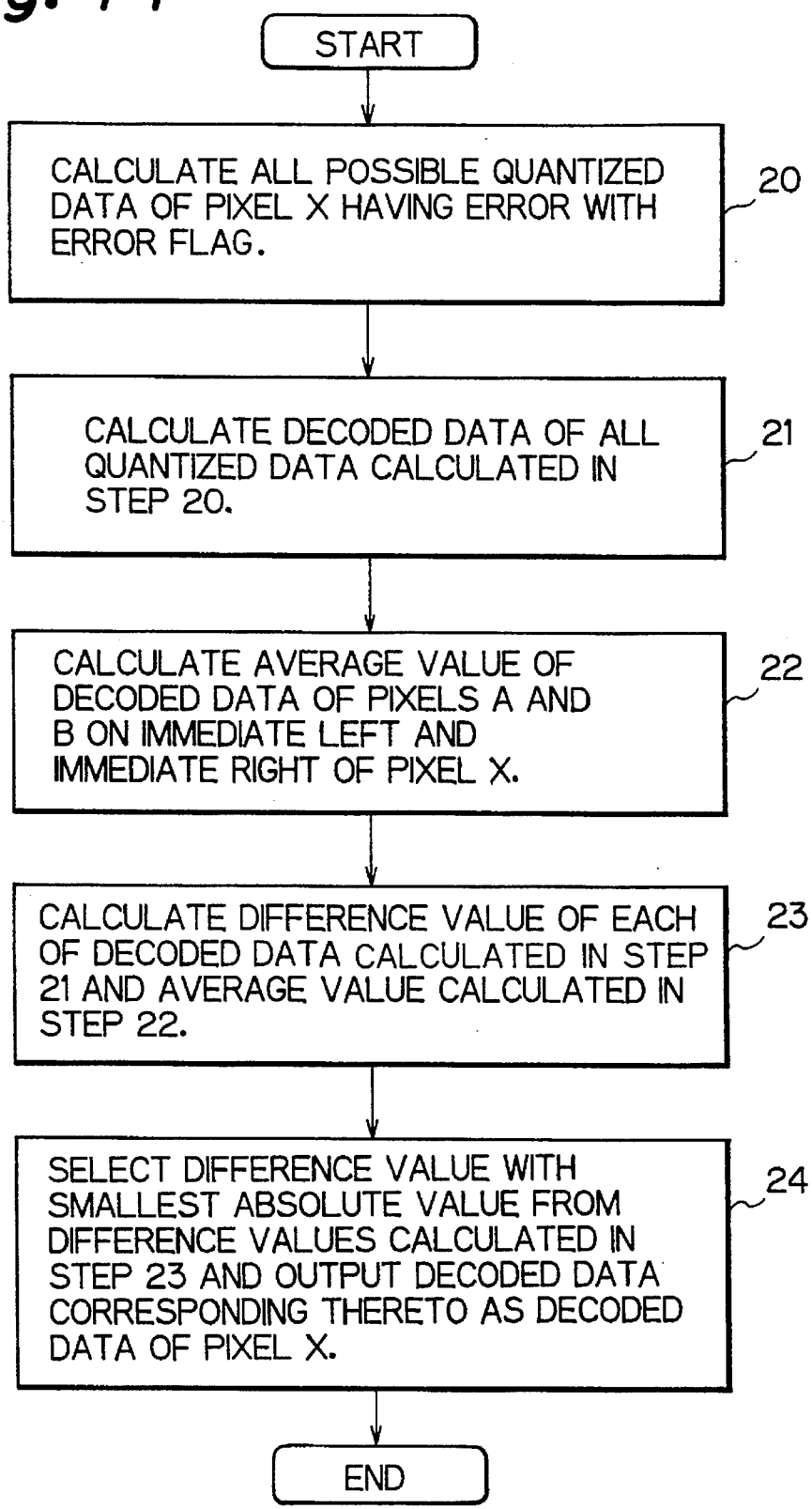
FIG. 11 is a flow chart showing a flow of the concealing process according to the present invention.

An output data of the block desegmentation circuit 16 is sent to an error correcting circuit 17. The error correcting circuit 17 performs a concealing process for each pixel with an error by using data of adjacent pixels. Next, the concealing process according to the present invention will be described. FIG. 11 is a flow chart showing the concealing process.

An example of the concealing process will be described. An error of each pixel is detected by determining whether the value of the error flag of data is not 0. When the value of the error flag is not 0, the data is quantized data rather than decoded data. Assume that a pixel X has an error, the quantized code thereof is 0110 (in binary notation), and the error flag thereof is 1000 (in binary notation). In this case, the four-bit error flag represents that an error has occurred only at the MSB. Thus, the true quantized code of the pixel X is either 0110 or 1110. At step 20, all quantized data which are possible for the pixel X are calculated.

Decoded data of all the quantized data calculated are obtained so as to create candidates of decoded values (at step 21). Assume that the dynamic range DR of a block which includes the pixel X is 129 and the minimum value MIN is 35. In this case, when the above-described equation for the decoding process is used, the true decoded value of the pixel X becomes 83 or 148.

As shown in FIG. 10, assume that pixels on the immediate left and immediate right of the objective pixel X are pixel A and pixel B. The average value of the decoded data of the pixels A and B is obtained (at step 22). When both the decoded data of the pixels A and B are 91, the average value there of is 91. The difference values between each of all the decoded data and the average value are obtained (at step 23). In this case, the difference values are 91−83=8 and 148−91=57.

The decoded data whose absolute value of the difference value is minimum is outputted as the decoded data of the pixel X (at step 24). In this case, the true decoded value of the pixel X is most probably 83 due to the correlation in the horizontal direction of the image. Thus, the value 83 is outputted as the decoded value of the pixel X.

For the sake of simplicity, pixels for use in the concealing process are assumed to be two pixels on the immediate left and immediate right of the objective pixel X. However, four pixels at the immediate upper, immediate lower, immediate left, and immediate right positions of the objective pixel X may be used. In addition, eight pixels which immediately surround the objective pixel X may be used. An output data of the error correcting circuit 17 is supplied to a D/A converter 18. Thus, data in raster scanning sequence corresponding to each pixel can be obtained at an output terminal 19.

In summary, according to the apparatus for concealing a digital image signal of the present invention, an error flag can be set for each bit of quantized code. Candidates of decoded data can be much reduced. From the reduced number of candidates, decoded data is determined with space correlation between an objective pixel and adjacent pixels.

In other words, in the conventional technique, since only one-bit error flag is provided for quantized code, candidates of decoded data cannot be limited to a small number. Thus, a pixel with an error is concealed by interpolating it with the average value of adjacent pixels in space or timely or substituting it with an adjacent pixel. Consequently, the pixel with the error is unremarkably concealed.

On the other hand, according to the present invention, since decoded data to be outputted are selected from a small number of candidates which always contain correct encoded data, true decoded data is much probably restored. In the conventional system, the resolution of the concealed portion is often deteriorated. However, according to the present invention, the probability of which the original resolution is maintained is high.

In addition, it is not always necessary to conceal errors of all bit planes. For example, a flag with respect to LSB of each decoded data which leads to a small error may be ignored.

In the above-described embodiment, a digital VTR which performs a highly efficient encoding process was described. However, the present invention is not limited to such a digital VTR. Instead, the present invention can be applied to digital VTRs which do not perform a data compressing process.

Moreover, the present invention can be incorporated in not only digital VTRs, but also various applications using transmission paths.

As described above, according to the present invention, with respect to decoding of quantized data where an error has occurred, the probability of which true decoded value is obtained is high. Thus, when the technique of the present invention is applied to a digital VTR, even if an error occurs in reproduced data, an excellent reproduced image can be obtained.

What is claimed is:

1. An apparatus for concealing error data of pixel data in a received digital image signal, comprising:

receiving means for receiving said digital image signal;

deframing means for detecting errors in said received digital image signal every predetermined unit, whereby each unit defines one of a plurality of bit planes, to generate a first error flag in high order bit planes including at least a most significant bit plane of bit planes having a plurality of bits, said first error flag representing a presence or absence of an error in each byte, and for forming a second error flag for said high order bit planes on the basis of said first error flag, said second error flag representing a presence or absence of an error in each bit plane; and error correcting means for calculating a plurality of possible data values of said pixel data based upon said second error flag and for selecting one data value from among said plurality of possible data values by taking a correlation between each of said possible data values and surrounding pixel data when said second error flag represents the presence of an error in said pixel data.

2. The apparatus according to claim 1, wherein said digital image signal which is received by said receiving means is shuffled and is constructed by arranging each bit for each of a plurality of said bit planes comprising a plurality of said pixel data and wherein a plurality of bits of said pixel data form at least one unit of error detection in each of said bit planes each including a plurality of bits pixel data located at positions different from those obtained when the pixel data is deshuffled.

3. The apparatus according to claim 2, wherein said error correcting means selects one data value from among said plurality of data values which are calculated by taking the correlation between each of said possible data values and two pixel data horizontally adjacent thereto.

4. An apparatus for concealing error data in a digital image data signal, said apparatus comprising:

means for receiving units of data corresponding to said digital image data signal in which each of said units includes a plurality of data bits;

deframing means for detecting errors in the received units of data and for generating a flag identifying whether the bits of each respective unit contain an error; and error correcting means for calculating a plurality of data values for the respective unit having a detected error based upon the respective flag, and for selecting one of the calculated data values from the plurality of calculated data values by considering correlation between each of said calculated data values and data adjacent thereto.

5. The apparatus according to claim 4, wherein said flag has a plurality of bits.

6. The apparatus according to claim 4, wherein said flag has a number of bits equal to the number of bits in each of said units.

7. The apparatus according to claim 6, wherein each of said units has four data bits and wherein said flag has four bits.

8. An apparatus for concealing error data in a digital image data signal, said apparatus comprising:

means for receiving units of data corresponding to said digital image data signal in which each of said units includes dynamic range data, minimum value data and a number of quantized data each having a plurality of data bits;

deframing means for detecting errors in the received units of data, said deframing means generates a first flag upon the detection of an error in said dynamic range data and said minimum value data and generates a second flag which identifies whether the data bits of a respective quantized data contain an error; and error correcting means for calculating a plurality of data values for the respective quantized data having a detected error based upon the respective second flag, and for selecting one of the calculated data values from the plurality of calculated data values by considering correlation between each of said calculated data values and data adjacent thereto.

9. The apparatus according to claim 8, wherein said second flag has a number of bits equal to the number of bits in each said quantized data.

10. The apparatus according to claim 9, wherein said first flag has one bit.

11. The apparatus according to claim 9, wherein each said quantized data has four data bits and wherein said second flag has four bits.

* * * * *